(12) United States Patent
Jackson, IV (10) Patent No.: US 11,352,040 B1
(45) Date of Patent: Jun. 7, 2022

(54) CART

(71) Applicant: Benjamin R. Jackson, IV, Bradenton, FL (US)

(72) Inventor: Benjamin R. Jackson, IV, Bradenton, FL (US)

(*) Notice: Subject to any disclaimer, the term of this patent is extended or adjusted under 35 U.S.C. 154(b) by 286 days.

(21) Appl. No.: 16/803,017

(22) Filed: Feb. 27, 2020

Related U.S. Application Data (60) Provisional application No. 62/812,277, filed on Mar. 1, 2019.

(51) Int. Cl.
| | |
|---|---|
| *B62B 1/16* | (2006.01) |
| *B62B 5/08* | (2006.01) |
| *B62B 1/00* | (2006.01) |
| *B62B 5/06* | (2006.01) |

(52) U.S. Cl.
CPC .............. *B62B 5/085* (2013.01); *B62B 1/008* (2013.01); *B62B 1/16* (2013.01); *B62B 5/065* (2013.01); *B62B 5/066* (2013.01)

(58) Field of Classification Search
CPC ......... B62B 5/085; B62B 5/065; B62B 5/066; B62B 1/008; B62B 1/16; B62B 1/10; B62B 1/12
See application file for complete search history.

(56) References Cited

U.S. PATENT DOCUMENTS

| | | | | |
|---|---|---|---|---|
| 4,460,188 | A * | 7/1984 | Maloof | B62B 1/20 |
| | | | | 297/188.1 |
| 6,457,727 | B1 | 10/2002 | Tolly | |
| 7,997,595 | B1 * | 8/2011 | Pope | B62B 1/16 |
| | | | | 280/47.35 |
| 9,826,711 | B1 * | 11/2017 | Evans | B62B 5/065 |
| 2005/0161916 | A1 | 7/2005 | Taylor | |

* cited by examiner

*Primary Examiner* — John D Walters
(74) *Attorney, Agent, or Firm* — Frijouf, Rust & Pyle, P.A.

(57) ABSTRACT

A cart for transporting an object includes a primary body for receiving the object. A plurality of wheels are rotatably coupled to the primary body for rolling the primary body over a surface. A handle is coupled to the primary body for grasping by the individual. A pivot is coupled between the primary body and the handle for positioning the handle between an operating position and a storage position. A secondary body defines a secondary aperture and a secondary chamber for receiving the object. The secondary body coupled to the handle. The primary body defines a primary support surface for supporting the lower torso of the individual. The secondary body defining a secondary support surface for supporting the upper torso of the individual. The storage position reduces the overall height of the primary body and the secondary body from the operating position for facilitating storage.

21 Claims, 12 Drawing Sheets

CART

CROSS-REFERENCE TO RELATED APPLICATIONS

This application claims benefit of U.S. Patent Provisional Application No. 62/812,277 filed Mar. 1, 2019. All subject matter set forth in Provisional Application No. 62/812,277 is hereby incorporated by reference into the present application as if fully set forth herein.

BACKGROUND OF THE INVENTION

Field of the Invention

This invention relates to a cart and more particularly to a cart for transporting an object and supporting an individual.

Background of the Invention

Carts serve to transport various items more efficiently and easily over a surface. Carts are very much in need when the various items are heavy, large in number of items to be carried and/or voluminous. Once the various items have been transported to their destination, the carts must be stored or relocated to a separate location. Many times the locations for housing the cart have very limited space. In addition, the cart maybe displaced over rough terrain whereby any shock or force received by the cart due to the rough terrain is thereby transferred into the transported items. Furthermore, the cart may be required to transport multiple items whereby the multiple items require different environmental and temperature conditions.

There have been many in the prior art who have attempted to solve these problems with varying degrees of success. None, however completely satisfies the requirements for a complete solution to the aforestated problem. The following U.S. patents and patent applications are attempts of the prior art to solve this problem.

U.S. Pat. No. 6,457,727 to Tolly discloses a hand truck includes an automatic height adjusting load platform, or alternatively, a kit of components provides for adding an adjustable load platform to an existing hand truck. The load platform position is held in a raised position while under no load conditions. A user places an article including a package on the raised platform, which is configured to rest at approximately waist level. In response to the weight of the article, the platform lowers, but the downward motion of the platform is inhibited by a platform arrestor. Preferably, the platform arrestor is configured such that the distance the platform will drop due to the weight of the load is proportional to the height of the article placed upon the platform. Thus the top of the article first placed upon the load platform is now substantially at waist level. This process can continue until the platform is lowered to the bottom of the shaft that the platform is slidably mounted to. Further, as articles are removed, under normal conditions, or where the load becomes unstable due to tipping or the like, the platform arrestor will control the rate at which the platform returns to its raised position. The load platform is further detachable for applications where having the platform in a raised position is undesirable.

U.S. Pat. No. 7,997,595 to Pope discloses a wheeled and collapsible disc golf caddy system to facilitate the pleasure of playing a game of disc golf. The system comprises an elongated frame member mounting a handle at one end thereof for towing the system behind the user thereof. Intermediate the frame member is a pair of collapsible wheels for easy transportation. The remote end of the frame member mounts a pivotal rim for removably receiving a drink containing chest that can be removably secured to the frame member by means such as VELCRO fastening members. Additionally, the system includes a housing, preferably U-shaped, mounted to the frame member and containing plural shelves for storing a variety of discs.

U.S. Patent Application 20050161916 to Taylor discloses an improved cart for use in transporting various materials over all types of terrain. The cart has a frame, a cargo platform which is perpendicular to the frame to transport cargo and rotates to the frame for compact storage, and a handle which retracts into the frame. A combination of a suspension system, wide wheel base, and pneumatic tires allows for widely diverse cargo to be transported over most types of indoor and outdoor terrain. The suspension system is fixed at forty five degrees to the frame providing the most efficient suspension system operation.

Although the aforementioned prior art have contributed to the development of the art of carts, none of these prior art patents have solved the needs of this art.

Therefore, it is an object of the present invention to provide an improved cart for transporting various items.

Another object of this invention is to provide an improved cart that may be easily stored in a limited space.

Another object of this invention is to provide an improved cart that maybe displaced over rough terrain whereby reducing the shock or force transferred to the transported item.

Another object of this invention is to provide an improved cart that is capable of transporting multiple items that require different environmental or temperature conditions.

Another object of this invention is to provide an improved cart that is simple for the user to use.

Another object of this invention is to provide an improved cart that is easy to cost effectively produce.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

A specific embodiment of the present invention is shown in the attached drawings. For the purpose of summarizing the invention, the invention relates to a can for transporting an object over a surface. The cart comprises a primary body defining a primary aperture and a primary chamber for receiving the object. A plurality of wheels are rotatably coupled to the primary body for rolling the primary body over the surface. A handle is coupled to the primary body for grasping by the individual. The handle receives a rotating force from the individual for transitioning the primary body between a static position and a dynamic position. The handle receives a displacement force during the dynamic position for displacing the primary body over the surface. A pivot is coupled between the primary body and the handle for positioning the handle between an operating position and a storage position. A secondary body defines a secondary aperture and a secondary chamber for receiving the object.

The secondary body is coupled to the handle. The primary body defines a primary support surface for supporting the lower torso of the individual when the primary body in the static position. The secondary body defines a secondary support surface for supporting the upper torso of the individual in the static position and the operating position. The storage position reduces the overall height of the primary body and the secondary body from the operating position.

In another embodiment of the invention, the plurality of wheels includes a first wheel and a second wheel. A first wheel plate extends between a proximal end and a distal end. The proximal end of the first wheel plate is pivotably coupled to the primary body. The first wheel is rotatably coupled to the distal end of the first wheel plate. A first suspension linkage is coupled between the primary body and the first wheel plate for defining a first wheel suspension for reducing shock forces to the primary body and the secondary body while transporting the cart over the surface. A second wheel plate extends between a proximal end and a distal end. The proximal end of the second wheel plate is pivotably coupled to the primary body. The second wheel rotatably is coupled to the distal end of the second wheel plate. A second suspension linkage is coupled between the primary body and the second wheel plate for defining a second wheel suspension for reducing shock forces to the primary body and the secondary body while transporting the cart over the surface.

In another embodiment of the invention, a support frame is coupled to the primary body and extending above the primary body. A seat is coupled to the support frame and extends over the primary body. The seat supports the lower torso of the individual.

In another embodiment of the invention, a handle elevation adjuster is coupled to the handle and the primary body for displacing the handle in an ascending displacement relative to the primary body or a descending displacement relative to the primary body. The handle elevation adjuster adjusts the height of the handle above the primary body. The handle elevation adjuster displaces the secondary body for defining a secondary body elevation adjuster. The secondary body elevation adjuster displaces the secondary body in the ascending displacement relative to the primary body or the descending displacement relative to the primary body. The secondary body elevation adjuster adjusts the height of the secondary support surface for adjusting the height engagement of the upper torso of the individual above the primary body.

In another embodiment of the invention, a pivot lock terminates pivoting of the handle relative to the primary body in the operating position of the handle.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
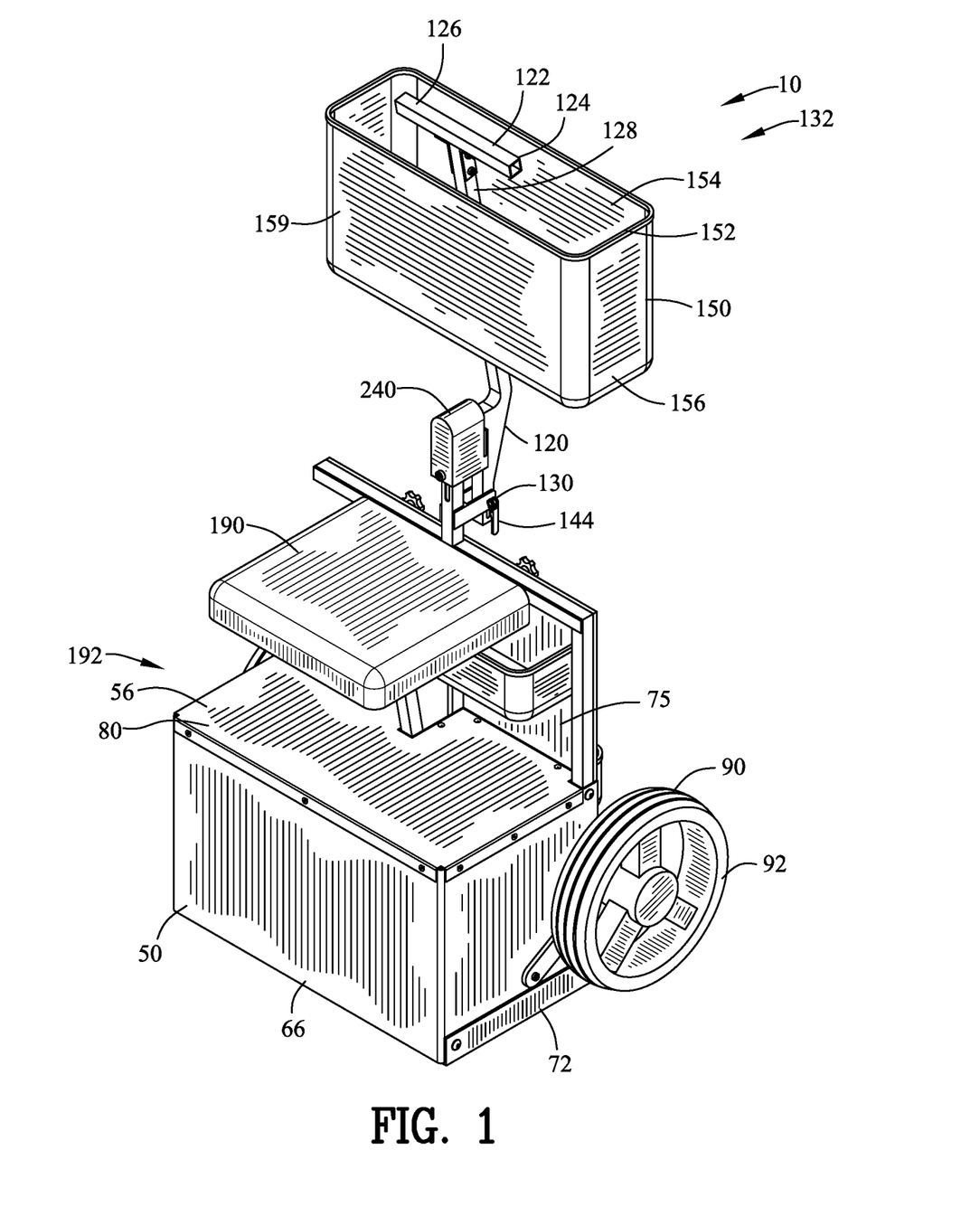
FIG. 1 is front isometric view of a cart incorporating the present invention.
Figure 2:
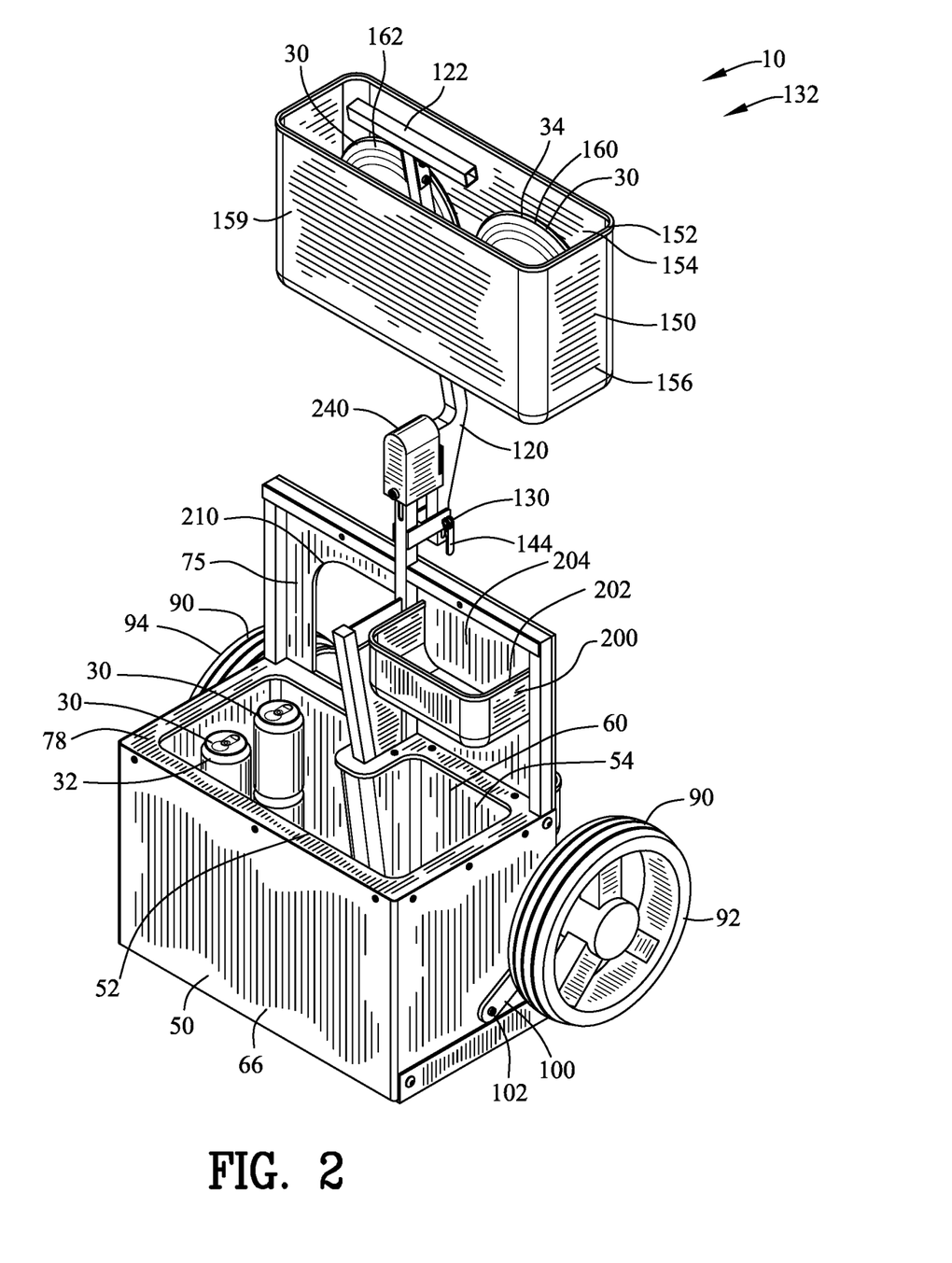
FIG. 2 is a view similar to FIG. 1 illustrating a plurality of objects inserted into the cart.
Figures 8, 9:
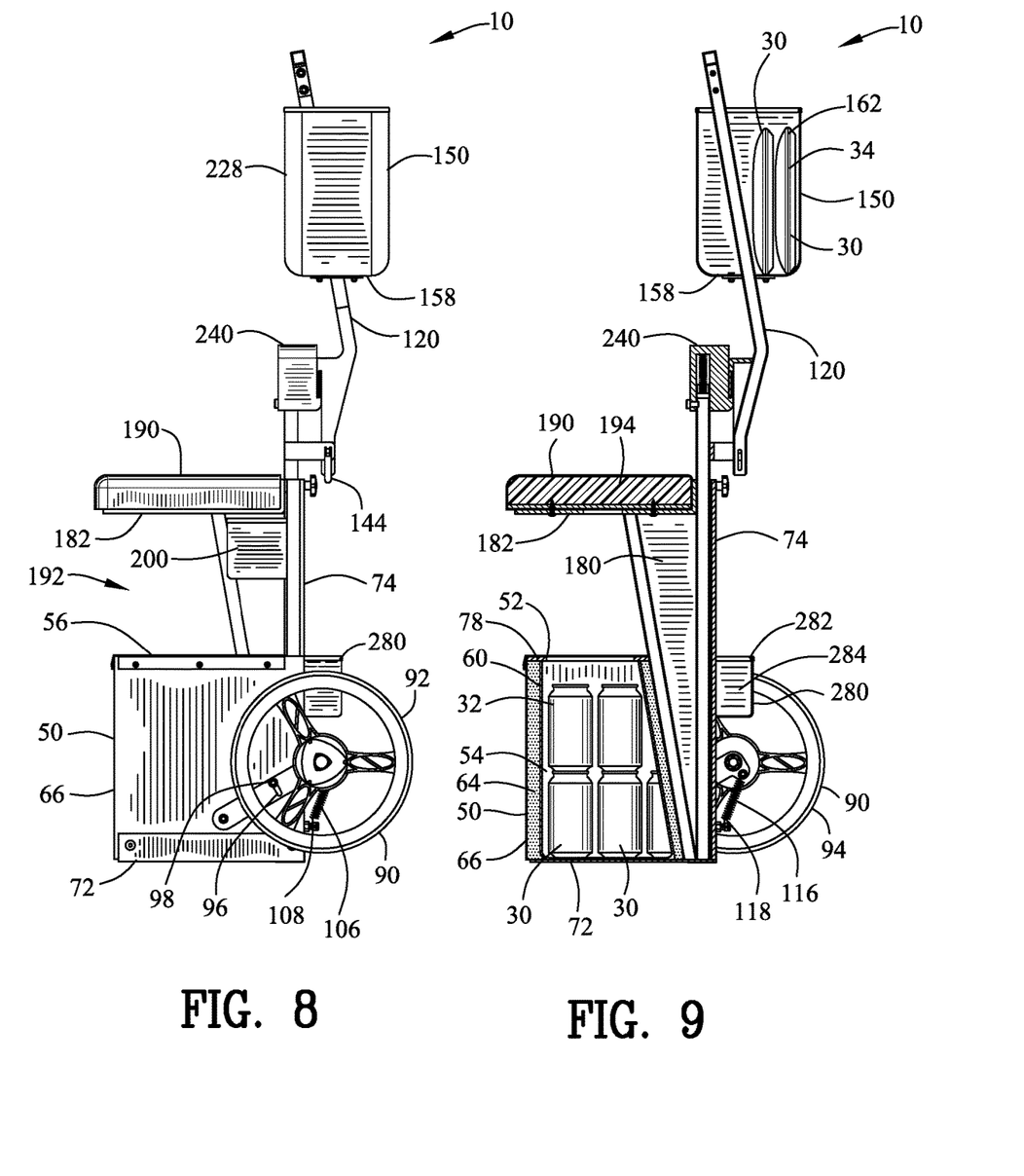
FIG. 8 is aright side view of FIG. 7.
FIG. 9 is a sectional view along line 9-9 in FIG. 7.
Figure 10:
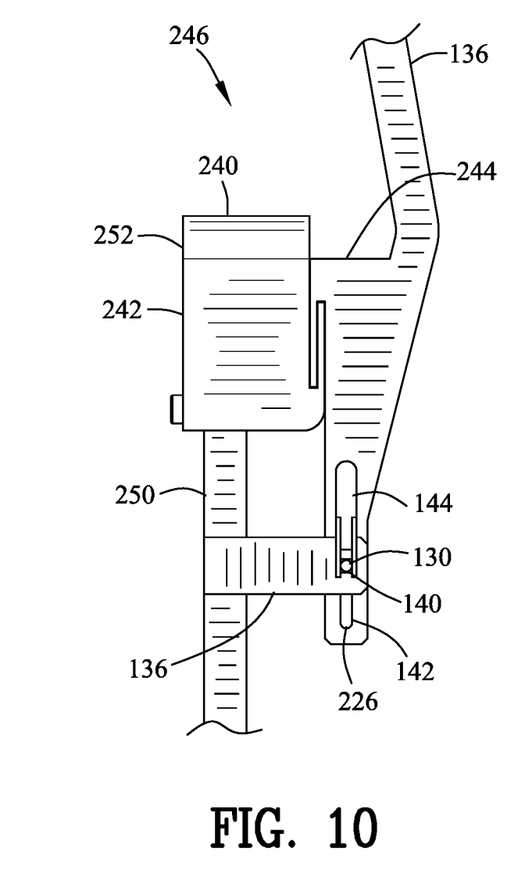
FIG. 10 is an enlarged portion of FIG. 8 illustrating a first latch element engaging with a second latch element.

FIGS. 1-19 illustrate a cart 10 for transporting an object 30 over a surface 12. The individual 20 has a lower torso 22 and an upper torso 24. The object 30 may include a beverage container, food container, electronic device, audio device, communication device, sports equipment, shelter equipment, entertainment device or other items. FIGS. 2 and 9 illustrate the object 30 including an aluminum can 32. FIGS. 2 and 9 further illustrate the object 30 including a sports throwing discs 34.

The cart 10 includes a primary body 50 defining a primary aperture 52 and a primary chamber 54 for receiving the object 30. The primary body 50 may include an interior container body 60 and an exterior container body 62. An insulating material body 64 may be positioned between the interior container body 60 and the exterior container body 62. The combination of the interior container body 60, the exterior container body 62 and the insulating material body 64 may define a cooler 66 for preventing the rapid warming of the object 30 within the primary chamber 54.

Figure 3:
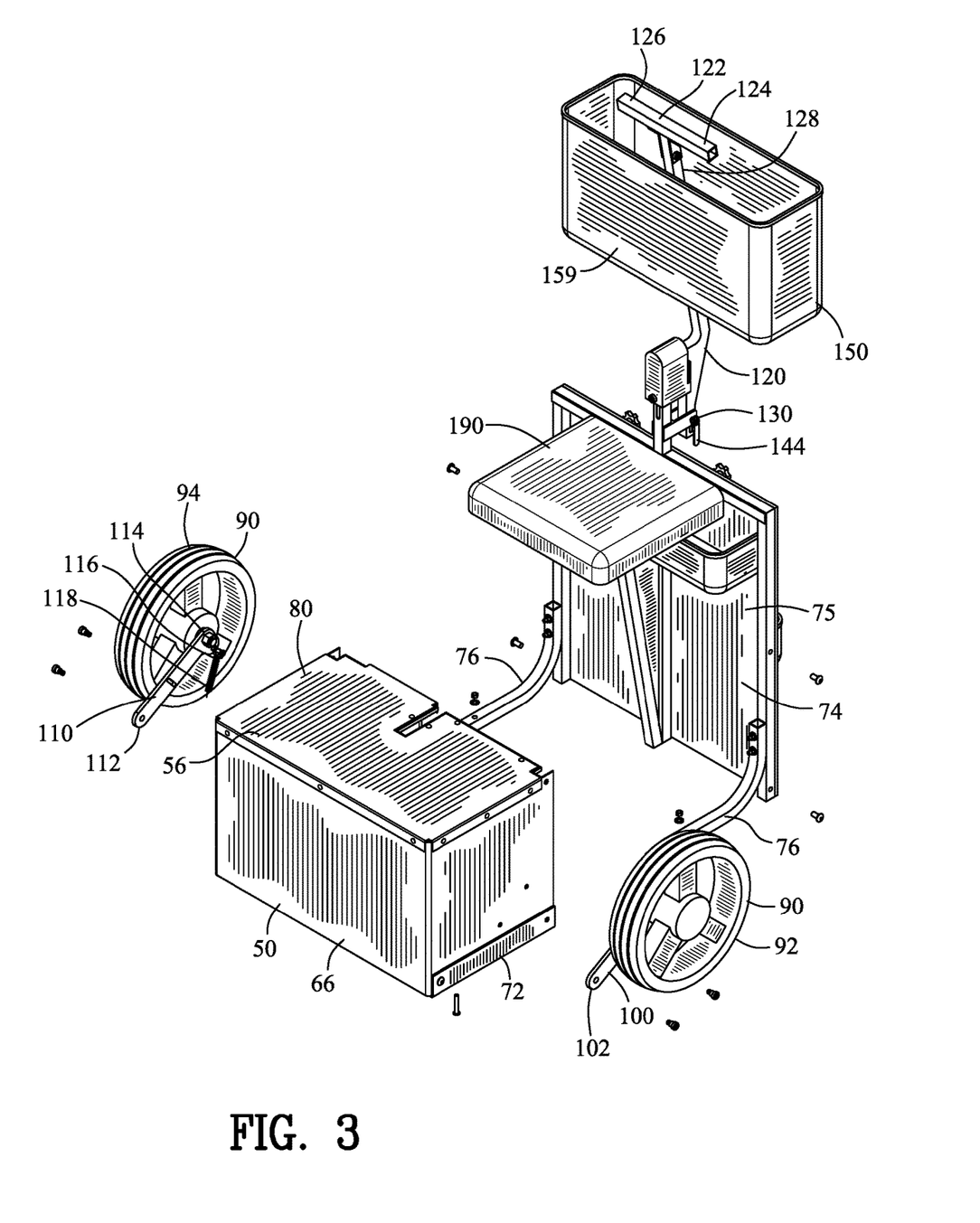
FIG. 3 is a partial exploded view of FIG. 1.
Figure 4:
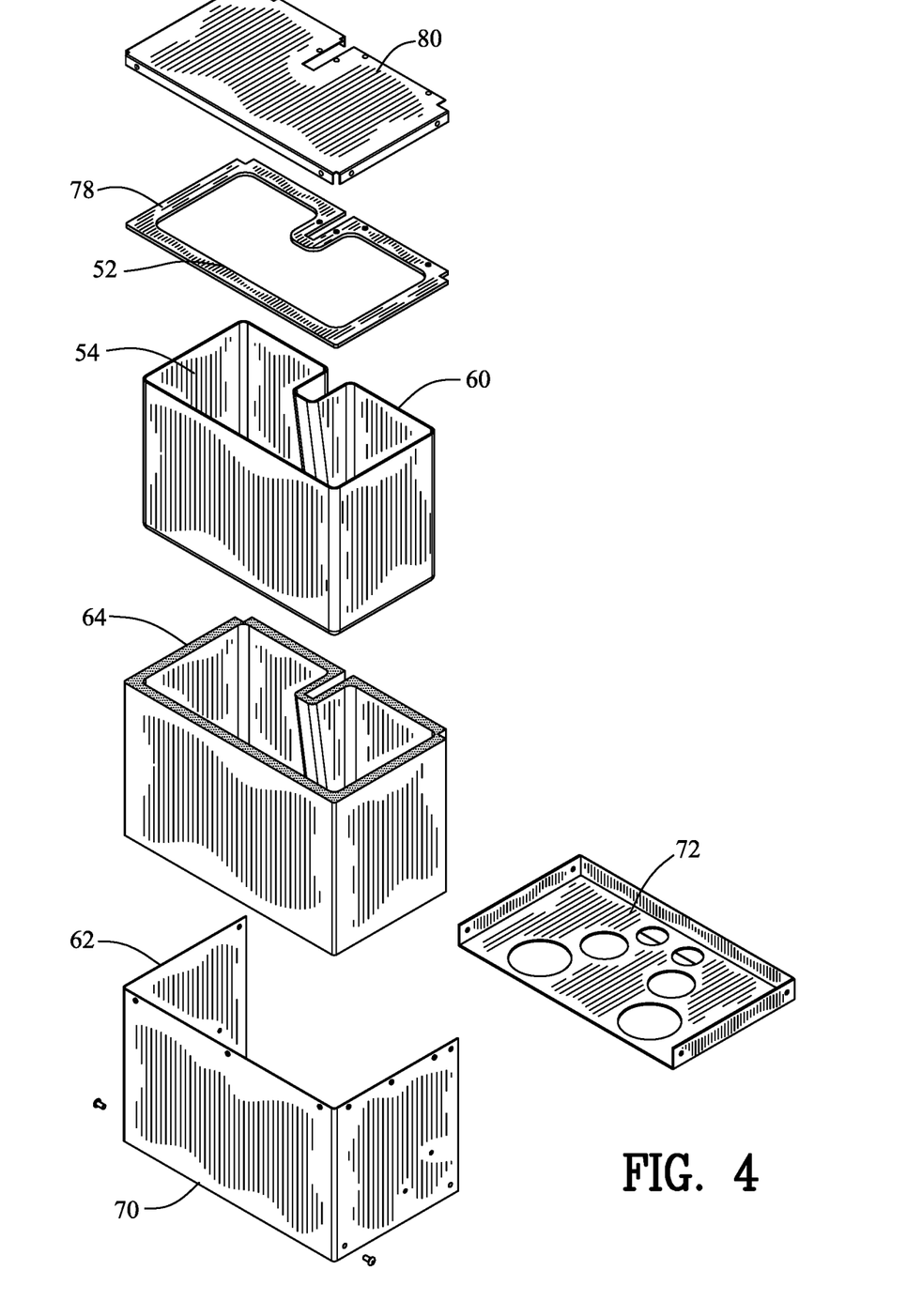
FIG. 4 is an exploded view of a primary body of FIG. 3.
Figure 5:
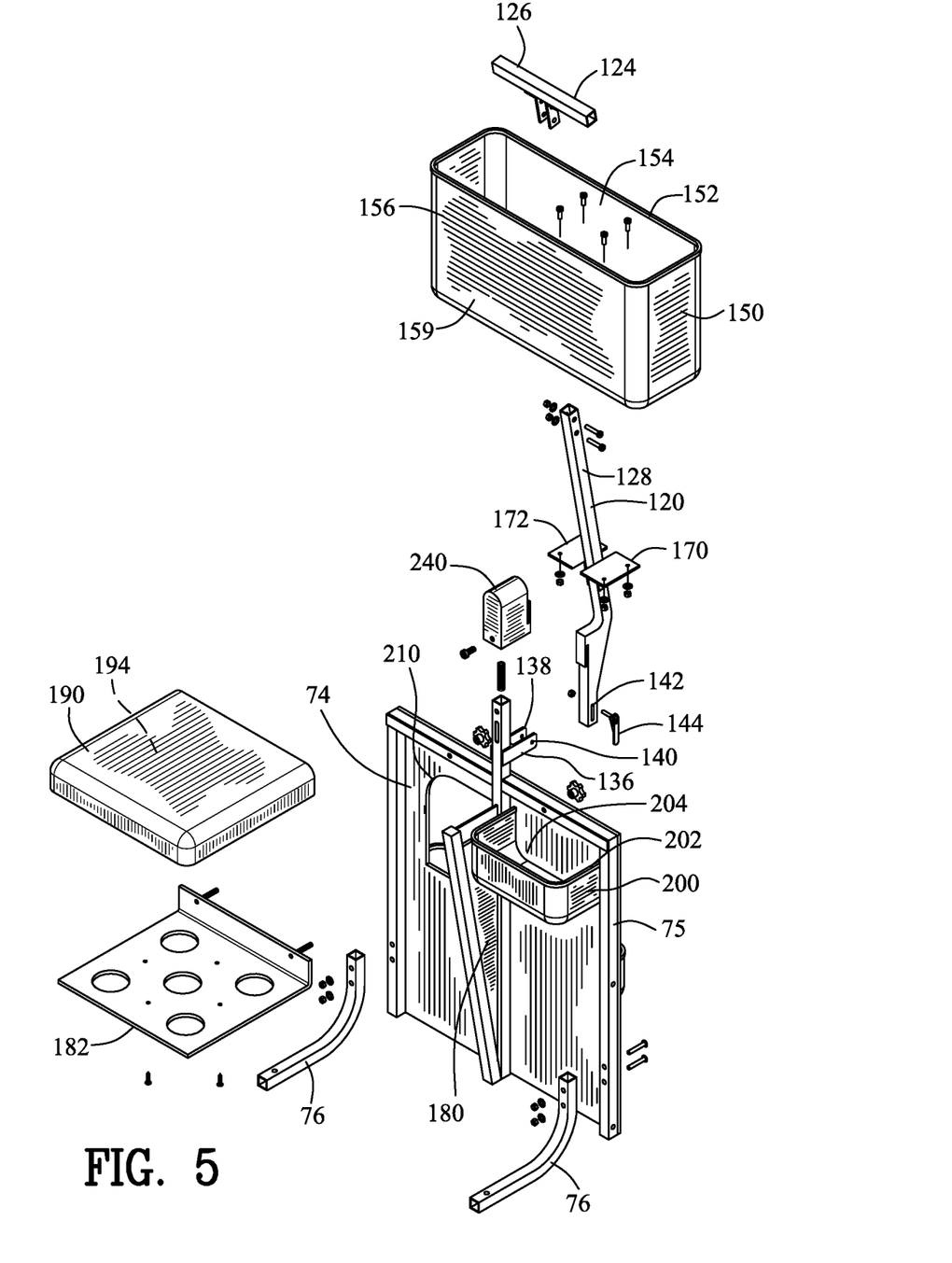
FIG. 5 is an exploded view of a handle, secondary body and seat of FIG. 3.
Figure 6:
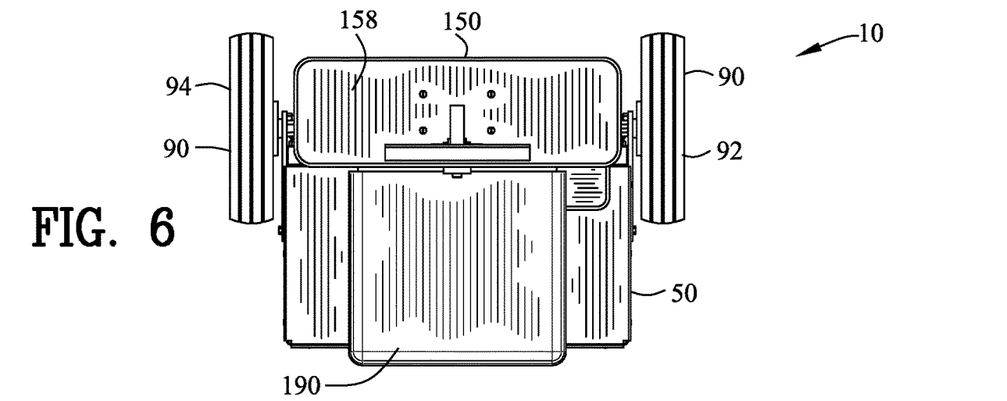
FIG. 6 is a top view of FIG. 1.
Figure 7:
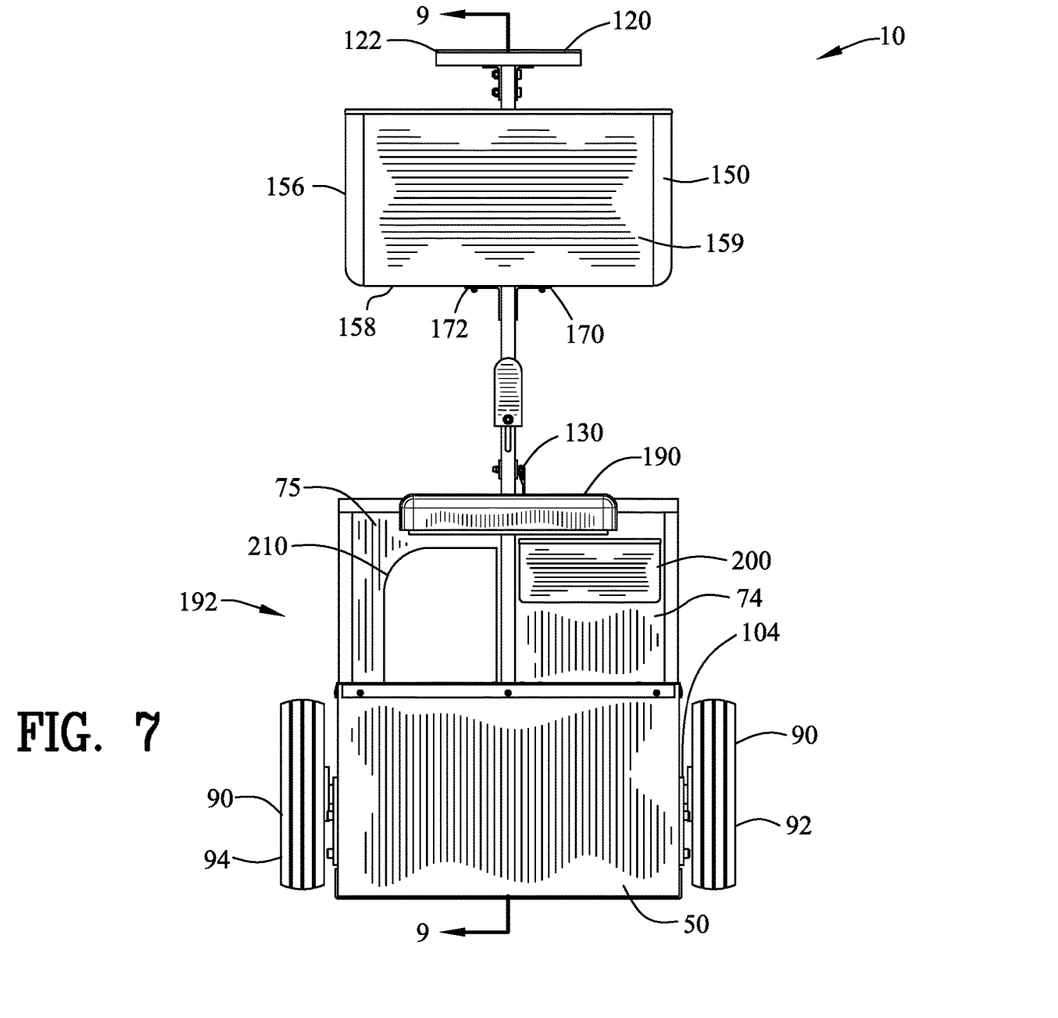
FIG. 7 is a front view of FIG. 1.

As best shown in FIG. 3-5, the exterior container body 62 may include a general C shaped body 70, a bottom panel 72 and a back panel 74. Preferably, the general C shaped body 70 and the bottom panel 72 are constructed of an integral one-piece unit. The integral one-piece unit may be constructed from a polymeric, carbon fiber, metallic or other materials. The back panel 74 may also be constructed of a polymeric, carbon fiber, metallic or other materials. The back panel 74 may be secured to the general C shaped body 70 by screws, bolts, adhesive or other means. Preferably, the back panel 74 extends above the interior container body 60 and the exterior container body 62. The portion of the back panel 74 that extends above the interior container body 60 defines a support frame 75. One or more general J shaped frames 76 may further secure the back panel 74 to the general C shape body 70 and bottom panel 72. The one or more general J shaped frames 76 further assists in transferring a rotational force that is applied to the back panel 74 to the general C shaped body 70 and bottom panel 72. An upper panel 78 may engage between the interior container body 60 and the exterior container body 62 for covering the insulating material body 64.

A primary closure 80 is coupled to the primary body 50 and covers the primary aperture 52 for sealing the primary chamber 54. The primary closure 80 may include a rigid and insulated lid pivotably coupled to the primary body 50 by one or more hinges. The rigid and insulated lid may be constructed of a polymeric, carbon fiber, metallic or other materials. Alternatively, the primary closure 80 may include a flexible material coupled to the primary body by one or more snaps, zippers or other fastening devices. The flexible material may be constructed of a natural fiber, flexible polymeric material or other flexible materials.

A plurality of wheels 90 are rotatably coupled to the primary body 50 for rolling the primary body 50 over the surface 12. The plurality of wheels may include a first wheel 92 and a second wheel 94. A first wheel plate 100 extends between a proximal end 102 and a distal end 104. The proximal end 102 of the first wheel plate 100 is pivotably coupled to the primary body 50. The first wheel 92 is rotatably coupled to the distal end 104 of the first wheel plate 100. A first suspension linkage 106 may be coupled between the primary body 50 and the first wheel plate 100 for defining a first wheel suspension 108 for reducing shock forces to the cart 10 while transporting the cart 10 over the surface 12.

A second wheel plate 110 extends between a proximal end 112 and a distal end 114. The proximal end 112 of the second wheel plate 110 is pivotably coupled to the primary body 50. The second wheel 94 is rotatably coupled to the distal end 114 of the second wheel plate 110. A second suspension linkage 116 is coupled between the primary body 50 and the second wheel plate 110 for defining a second wheel suspension 118 for reducing shock forces to the cart 10 while transporting the cart 10 over the surface 12. The first suspension linkage 106 and the second suspension linkage 116 may include a coiled spring, gas shock absorber, hydraulic shock absorber pension plate or other force absorbing devices.

Figures 15, 16:
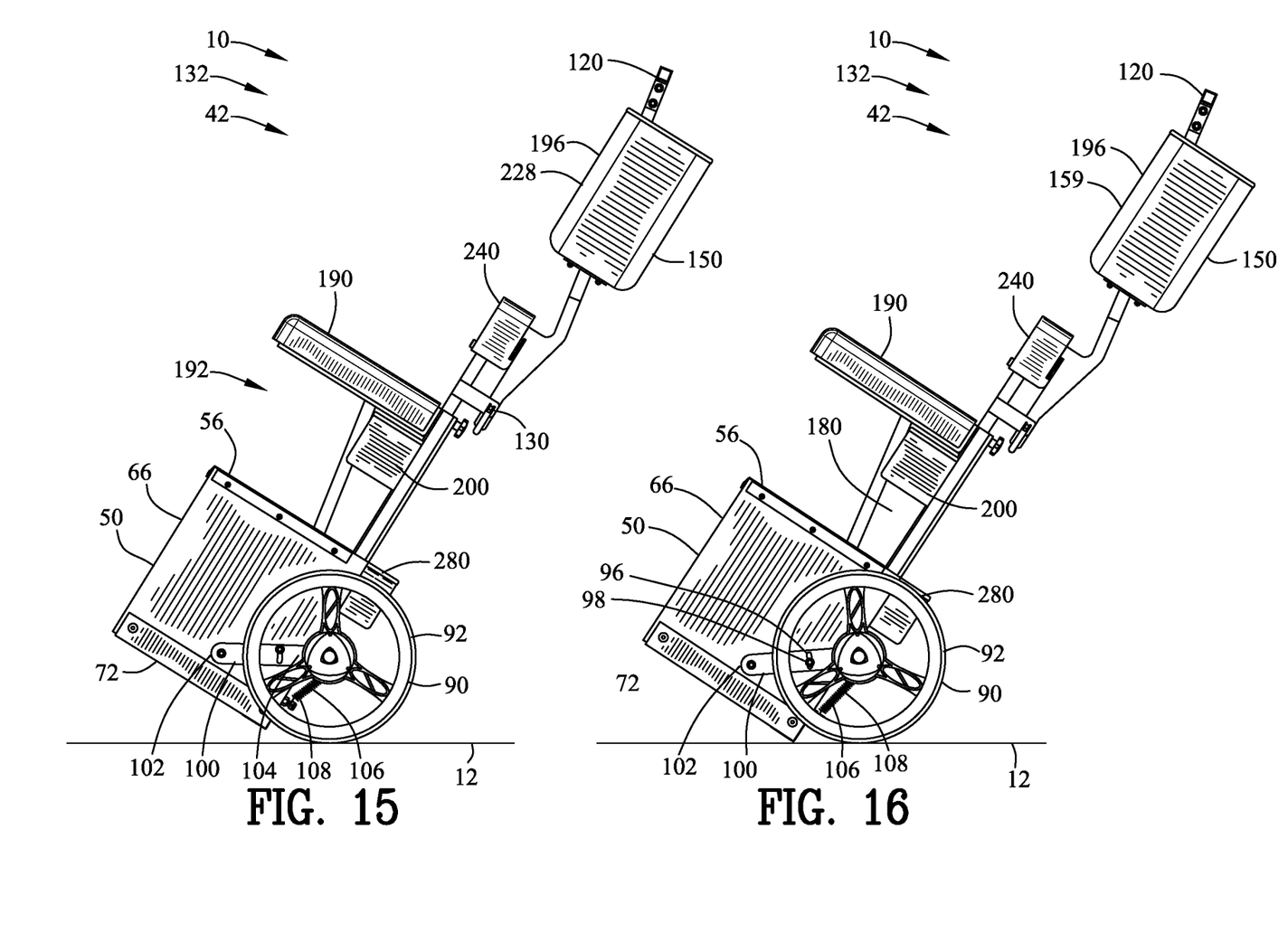
FIG. 15 is a view similar to FIG. 8 illustrating the cart tilted to the right in order for the plurality of wheels to support the card on a surface.
FIG. 16 is a view similar to FIG. 15 illustrating a first suspension linkage between the primary body and a first wheel and a second suspension linkage coupled between the primary body and a second wheel being displaced for reducing shock forces to the primary body and the secondary body while transporting the cart with the surface.

FIG. 15 illustrates the first suspension linkage 106 and the second suspension linkage 116 supporting the cart 10 in the dynamic position. 42. FIG. 16 illustrates the first suspension linkage 106 and the second suspension linkage 116 being displaced upon a shock force to impose on the cart 10 while transporting the cart 10 over the surface 12. The activation of the first suspension linkage 106 and the second suspension linkage 116 reducing the shock forces to the cart 10 while transporting the cart 10 over the surface 12. The first wheel plate 100 and the second wheel plate 110 may include a travel resister slot 96 and resister pin 98 for resisting the total pivoting displacement of the first wheel plate 100 and the second wheel plate 110.

A handle 120 is coupled to the primary body 50 for grasping by the individual 20. The handle 120 receives a rotating force from the individual 20 for transitioning the primary body 50 between a static position 40 as shown in FIGS. 1, 2, 6-9 and 17 and a dynamic position 42 as shown in FIGS. 15 and 16. The handle 120 receives a displacement force during the dynamic position 42 for displacing the cart 10 over the surface 12. The handle 120 may include a general T-shape defining a primary arm 124, a secondary arm 126 and an extension bar 128. The general T-shape facilitates the grasping of the handle 120 and facilitates applying a horizontal force to the cart 10 for displacing the cart 10 over the surface 12. In addition, the general T-shape facilitates applying a rotational force to the cart 10 for displacing the cart 10 between the static position 40 and the dynamic position 42.

Figure 17:
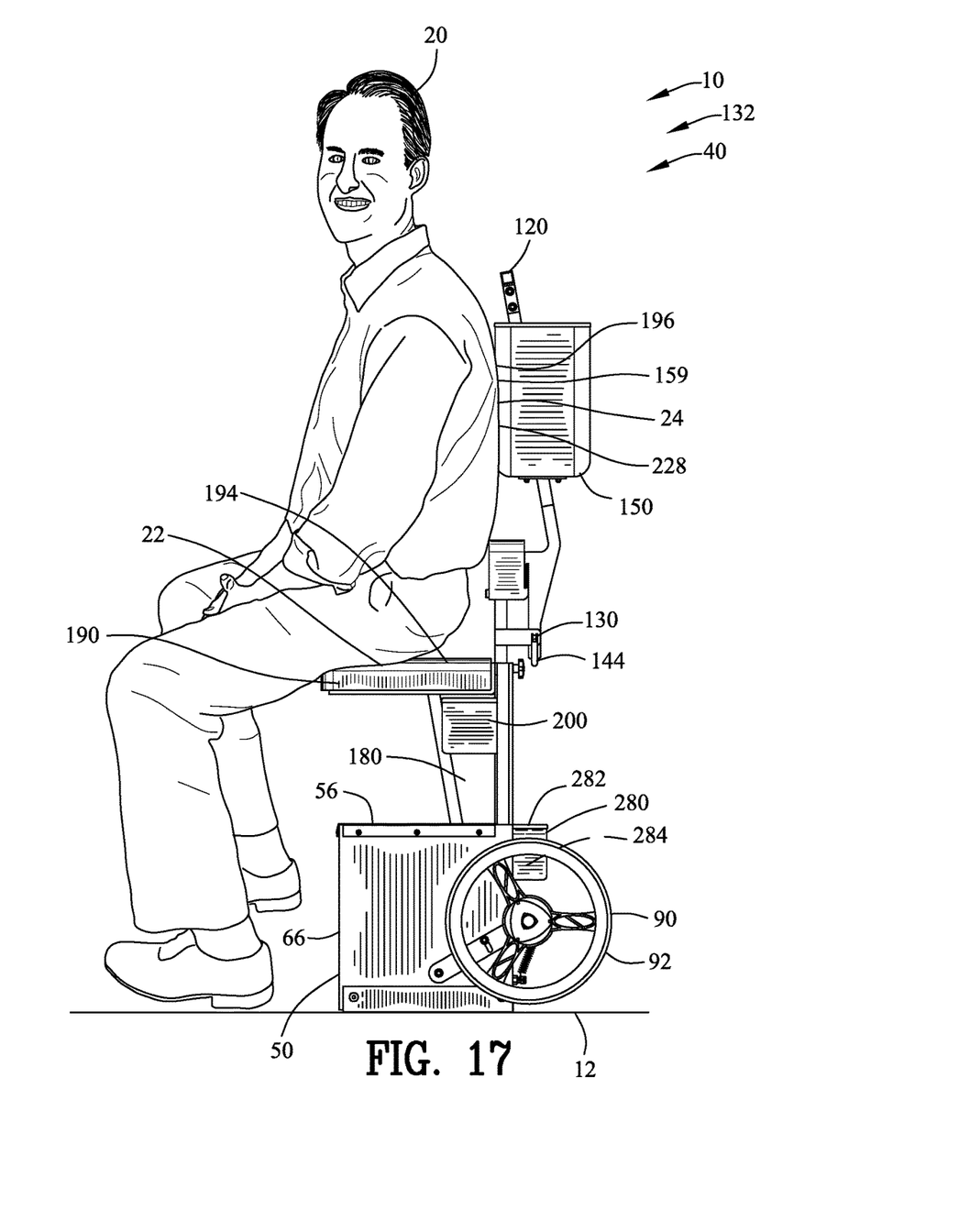
FIG. 17 is a view similar to FIG. 8 illustrating the seat supporting the lower torso of the individual and the secondary body supporting the upper torso of the individual.
Figure 18:
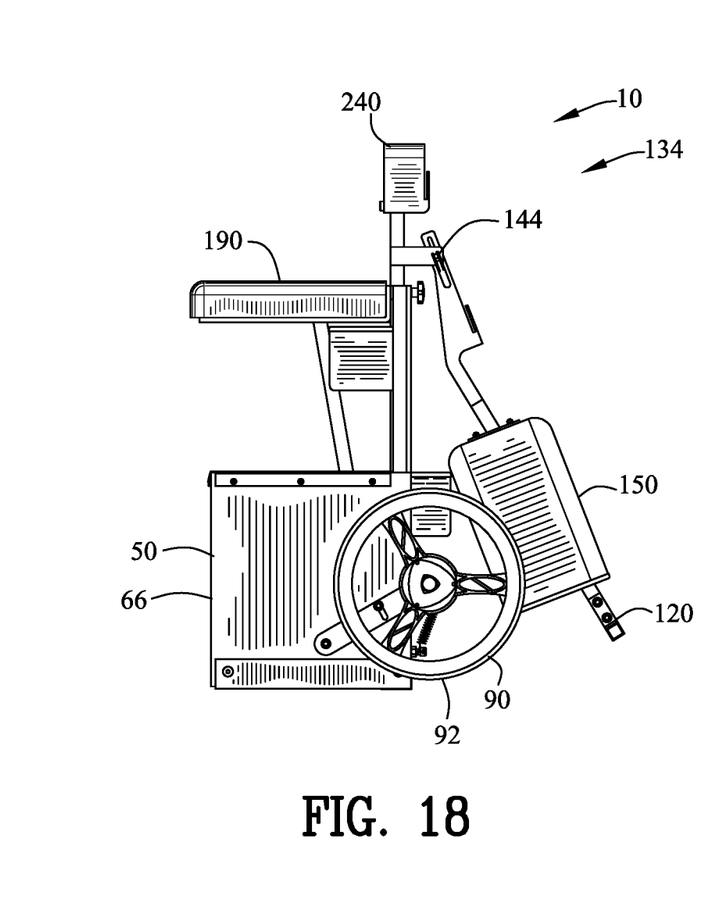
FIG. 18 is a view similar to FIG. 8 illustrating the handle and secondary body being pivoted into a storage position for facilitating the storage of the cart.
Figure 19:
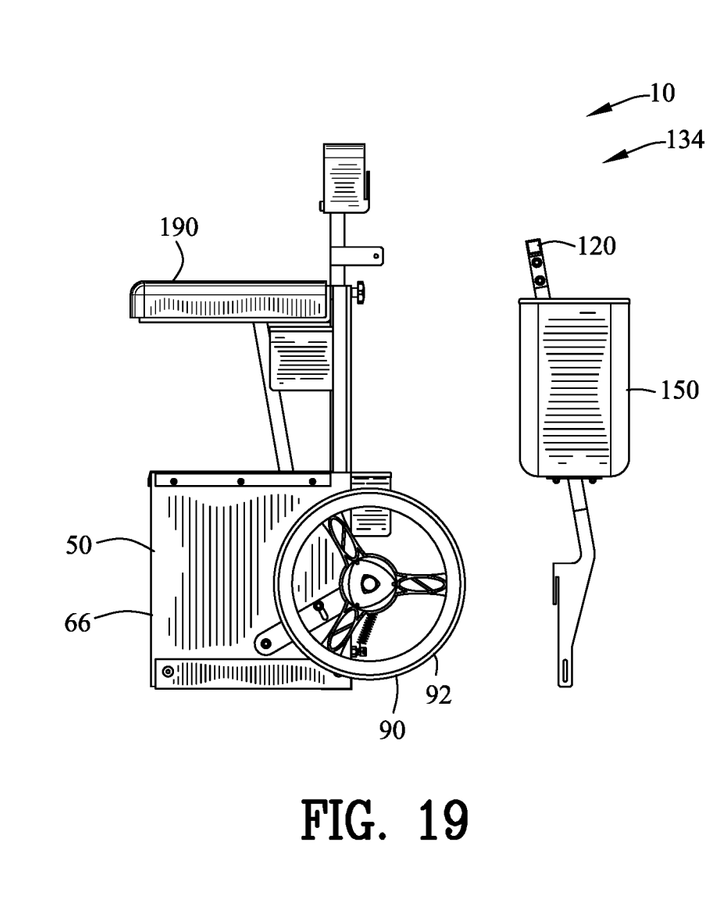
FIG. 19 is a view similar to FIG. 18 illustrating the handle and secondary body being removed from the primary body facilitating the storage of the cart.

A pivot 130 is coupled between the primary body 50 and the handle 120 for positioning the handle 120 between an operating position 132 as shown in FIGS. 1-3, 6-12, 14-17 and a storage position 134 as shown in FIG. 18. The storage position 134 reduces the overall height of the cart 10. More specifically, the pivot 130 permits the secondary body to be positioned adjacent to the primary body for facilitating storage of the primary body and the secondary body.

The pivot 130 may include a first pivot bracket 136 and second pivot bracket 138. Both of the first pivot bracket 136 and the second pivot bracket 138 have a bracket aperture 140. The handle 120 may include a handle aperture 142. The handle 120 is positioned between the first pivot bracket 136 and the second pivot bracket 138 such that the bracket aperture 140 and the handle aperture 142 are aligned. A quick release clamp 144 may traverse the bracket aperture 140 and the handle aperture 142 for compressing the first pivot bracket 136 and the second pivot bracket 138 against the handle 120 and terminating pivoting displacement of the handle 120 relative to the primary body 50.

A secondary body 150 defines a secondary aperture 152 and a secondary chamber 154 for receiving the object 30. The secondary body 150 is coupled to the handle 120. The secondary body 150 includes a plurality of side walls 156, and a bottom wall 158. Preferably, the secondary body 150 is constructed of an integral one-piece unit. The integral one-piece unit may be constructed from a polymeric, carbon fiber, metallic or other materials. Preferably, the handle 120 traverses the bottom wall 158 of the secondary body 150 and traverses the secondary chamber 154 and out through the secondary aperture 152. Furthermore, the general T shape 122 is positioned above the secondary body. As best shown in FIGS. 2 and 9, preferably the secondary body 150 is dimensioned for receiving a first row of throwing discs 160 and a second row of throwing discs 162 on either side of the handle 120. As a result, the object 30 position within the secondary body 150 is easily accessible due to its close proximity to the general T shape 122 of the handle 120. A first L-bracket 170 and a second L-bracket 172 may be coupled to the handle 124 providing a larger supporting area for the secondary body 150.

As shown in FIG. 17, the primary body 50 defines a primary support surface 56 for supporting the lower torso 22 of the individual 20 when the primary body 50 is in the static position. 40. The secondary body 150 defines a secondary support surface 159 for supporting the upper torso 24 of the individual 20 in the static position 40 and the operating position 132.

Alternatively, the cart 10 may include a triangular plate 180 coupled to the primary body 50. The triangular plate 180 extends above the primary body 50. The triangular plate 180 has an enlarged edge above the primary body 50. A seat support plate 184 may be coupled to the support frame 75 and the triangular plate 180.

A seat 190 is coupled to the support frame 75 and the triangular plate 180 and extends over the primary body 50. More specifically, the seat 190 may be coupled to the seat support plate 184. The seat 190 supports the lower torso 22 of the individual 20. The seat 190 and the primary body 50 defines an access channel 192 wherein the individual 20 may gain access of the object 30 within the primary chamber 54 while sitting on the seat 190 by reaching through the access channel 192.

A lower cushion layer 194 may be coupled to the seat 190 for cushioning the contact area with the lower torso 22 of the individual 20. An upper cushion layer 196 may be coupled to the secondary support surface 159 for cushioning the contact area with the upper torso 24 of the individual 20. The lower cushion layer 194 and the upper cushion layer 196 may be constructed of a memory foam, air chambers or other deformable materials.

The cart 10 may further include a third body 200 defining a third aperture 202 and a third chamber 204 for receiving the object 30. The third body 200 is coupled to the support frame 75. Preferably, the third body 200 is constructed of an integral one-piece unit. The integral one-piece unit may be constructed from a polymeric, carbon fiber, metallic or other materials.

As best shown in FIGS. 2 and 5, a frame aperture 210 may be within the support frame 75. The frame aperture 210 permits access through the support frame 75 and into the primary aperture 52 of the primary body 50. The frame aperture 210 permits an individual who is positioned on the rearward side of the cart 10 to reach the primary chamber 54 and retrieve the object 30 without having to circle the cart 10 to be in front of the primary body 50.

As best shown in FIGS. 10-14, the cart 10 may include a handle elevation adjuster 220. The handle elevation adjuster 220 is coupled to the handle 120 and the primary body 50 for displacing the handle 120 in either an ascending displacement relative to the primary body or a descending displacement relative to the primary body. More specifically, the handle elevation adjuster 220 includes an elongated slot 222 in the location of the handle aperture 142 that permits displacement of the handle 120 relative to the first pivot bracket 136 and the second pivot bracket 138. The elongated slot 222 has an upper slot stop 224 and a lower slot stop 226. The handle elevation adjuster 220 adjusts the height of the handle 120 above the primary body 50.

The handle elevation adjuster 220 further serves to displace the secondary body 150 for defining a secondary body elevation adjuster 228. The secondary body elevation adjuster 228 displaces the secondary body 150 in the ascending displacement relative to the primary body 50 or the descending displacement relative to the primary body 50. The secondary body elevation adjuster 228 adjusts the height of the secondary support surface 150 for adjusting the height engagement of the upper torso 24 of the individual 20 above the primary body 50.

As best shown in FIGS. 10-14, the cart 10 may further a pivot lock 240 that terminates pivoting of the handle 120 relative to the primary body 50 in the operating position 132 of the handle 120. The pivot lock 240 may include a first latch element 242 and a second latch element 244. The first latch element 242 slidably engages the primary body 50 between a latch lock position 246 and a latch unlock position 248. The second latch element 244 is coupled to the handle 120. The latch lock position 246 defines the first latch element 242 engaging with the second latch element 244 for maintaining the handle 120 in the operating position 132. The latch unlock position 248 defines the first latch element 242 disengaging with the second latch element 244 for permitting pivoting of the handle 120 relative to the primary body 50 and positioning the handle 120 in the storage position 134. More specifically, the first latch element 242 may include a latch rod 250 coupled to the frame support 75. A latch socket 252 having a socket bore 254 slidably engages the latch rod 250. A socket arm 256 is couple to the exterior of the latch socket 252 for defining a socket arm channel 258 between the latch socket 252 and the socket arm 256. A spring 260 is inserted into the socket bore 254 and engages the distal end of the latch rod 250. The spring 260 biases the latch socket 252 in an ascending displacement relative to the handle 120. The latch rod 250 may include a set fastener channel 262. A set fastener 264 may engage the latch socket 252 and engages the set fastener channel 262. The set fastener 264 engaging the set fastener channel 262 permits the slidably coupling of the latch socket 252 with the latch rod 250 and prohibits the latch socket 252 from being removed from the latch rod 250.

The second latch element 244 may include a L-shape latch 270 that is coupled to the handle 120. The handle 120 and the L-shaped latch 270 define a latch channel 272 there between. When the handle 120 in the operating position 132 the L-shaped latch 270 is positioned within the socket arm channel 258 and simultaneously the socket arm 256 is positioned within the latch channel 272. In order to remove the handle 120 from the operating position 132 and into the storage position 134, a descending force is applied to the latch socket 252 for displacing the latch socket 252 in a descending direction and compressing spring 260. Upon the removal of the L-shaped latch 270 from the socket arm channel 258 and simultaneous removal of the socket arm 256 from the latch channel 272 handle with 23 pivot from the operating position 132.

Figure 11:
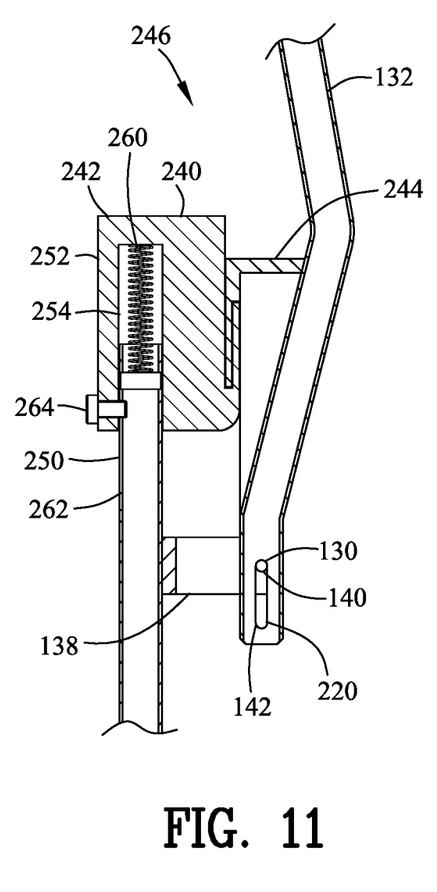
FIG. 11 is enlarged portion of FIG. 9 illustrating the first latch element engaging with the second latch element.
Figure 12:
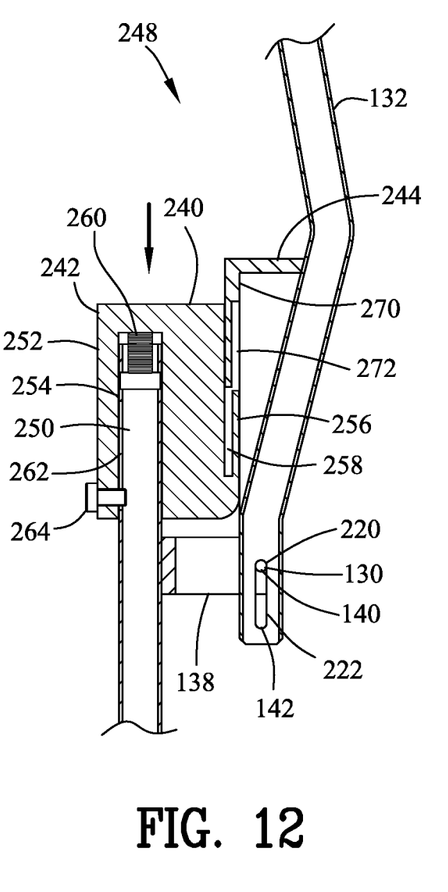
FIG. 12 is a view similar to FIG. 11 illustrating the first latch element being depressed for disengaging with the second latch element for permitting the handle to pivot relative to the primary body.
Figure 13:
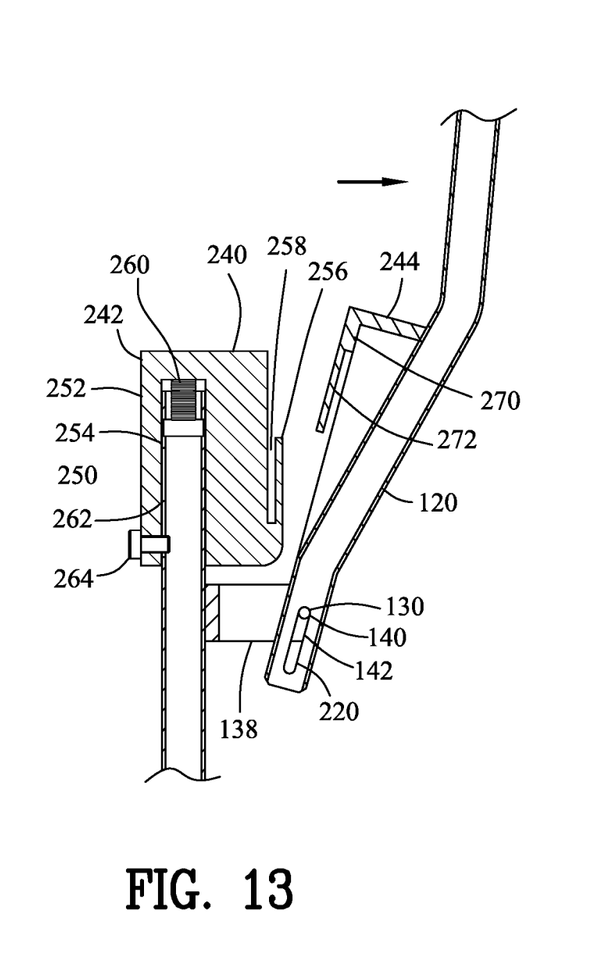
FIG. 13 is a view similar to FIG. 12 illustrating the handle pivoting relative to the primary body.
Figure 14:
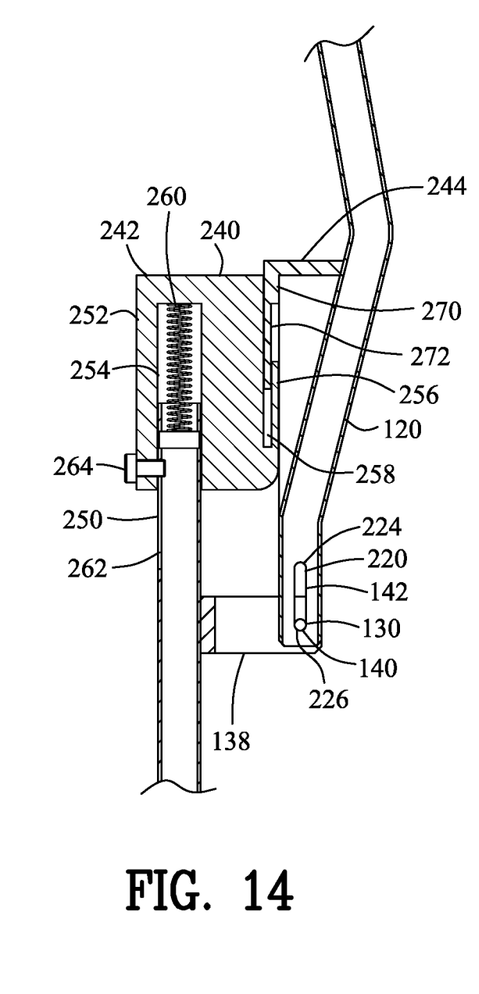
FIG. 14 is a view similar to FIG. 11 illustrating the handle being displaced in an ascending direction by a handle elevation adjuster for changing the elevation of the handle and secondary body relative to the primary body.

As shown in FIGS. 11 and 14 the handle elevation adjuster 220 remains functional concurrently with the pivot lock 420 as shown in lowest elevation position in FIG. 11 and the highest elevation position as shown in FIG. 14.

The cart 10 may further include a fourth body 280 defining a fourth aperture 282 and a fourth chamber 284 for receiving the object 30. The fourth body 280 is coupled to the rear side of the back panel 74. Preferably, the fourth body 200 is constructed of an integral one-piece unit. The integral one-piece unit may be constructed from a polymeric, carbon fiber, metallic or other materials.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A cart for transporting an object over a surface, an individual having a lower torso and an upper torso, the cart, comprising:
a primary body defining a primary aperture and a primary chamber for receiving the object;
a plurality of wheels rotatably coupled to said primary body for rolling said primary body over the surface;
a handle coupled to said primary body for grasping by the individual;
said handle receiving a rotating force from the individual for transitioning said primary body between a static position and a dynamic position;
said handle receiving a displacement force during said dynamic position for displacing said primary body over the surface;
a pivot coupled between said primary body and said handle for positioning said handle between an operating position and a storage position;
a secondary body defining a secondary aperture and a secondary chamber for receiving the object;
said secondary body coupled to said handle;
said primary body defining a primary support surface for supporting the lower torso of the individual when said primary body in said static position;
said secondary body defining a secondary support surface for supporting the upper torso of the individual in said static position and said operating position; and
said storage position reducing the overall height of said primary body and said secondary body from said operating position.

2. The cart as set forth in claim 1, further including a primary closure coupled to said primary body and covering said primary aperture for sealing said primary chamber.

3. The cart as set forth in claim 1, wherein said plurality of wheels include a first wheel and a second wheel;
a first wheel plate extending between a proximal end and a distal end;
said proximal end of said first wheel plate pivotably coupled to said primary body;
said first wheel rotatably coupled to said distal end of said first wheel plate;
a first suspension linkage coupled between said primary body and said first wheel plate for defining a first wheel suspension for reducing shock forces to said primary body and said secondary body while transporting the cart over the surface;
a second wheel plate extending between a proximal end and a distal end;
said proximal end of said second wheel plate pivotably coupled to said primary body;
said second wheel rotatably coupled to said distal end of said second wheel plate; and
a second suspension linkage coupled between said primary body and said second wheel plate for defining a second wheel suspension for reducing shock forces to said primary body and said secondary body while transporting the cart over the surface.

4. The cart as set forth in claim 1, further including a support frame coupled to said primary body and extending above said primary body;
a seat coupled to said support frame and extending over said primary body; and
said seat supporting the lower torso of the individual.

5. The cart as set forth in claim 4, further including a lower cushion layer coupled to said seat for cushioning the contact area with the lower torso of the individual; and
an upper cushion layer coupled to said secondary support surface for cushioning the contact area with the upper torso of the individual.

6. The cart as set forth in claim 4, further including a third body defining a third aperture and a third chamber for receiving the object; and
said third body coupled to said support frame.

7. The cart as set forth in claim 4, further including a frame aperture within said support frame; and
said frame aperture permitting access through said support frame and into said primary aperture of said primary body.

8. The cart as set forth in claim 1, further including a handle elevation adjuster coupled to said handle and said primary body for displacing said handle in an ascending displacement relative to said primary body or a descending displacement relative to said primary body; and
said handle elevation adjuster adjusting the height of said handle above said primary body.

9. The cart as set forth in claim 8, wherein said handle elevation adjuster displaces said secondary body for defining a secondary body elevation adjuster;
said secondary body elevation adjuster displacing said secondary body in said ascending displacement relative to said primary body or said descending displacement relative to said primary body; and
said secondary body elevation adjuster adjusting the height of said secondary support surface for adjusting the height engagement of the upper torso of the individual above said primary body.

10. The cart as set forth in claim 1, further including a pivot lock for terminating pivoting of said handle relative to said primary body in said operating position of said handle.

11. The cart as set forth in claim 10, wherein said pivot lock includes a first latch element and a second latch element;
said first latch element slidably engaging said primary body between a latch lock position and a latch unlock position;
said second latch element coupled to said handle;
said latch lock position defining said first latch element engaging with said second latch element for maintaining said handle in said operating position; and
said latch unlock position defining said first latch element disengaging with said second latch element for permitting pivoting of said handle relative to said primary body and positioning said handle in said storage position.

12. A cart for transporting an object over a surface, an individual having a lower torso and an upper torso, the cart, comprising:
a primary body defining a primary aperture and a primary chamber for receiving the object;
a plurality of wheels rotatably coupled to said primary body for rolling said primary body over the surface;
a handle coupled to said primary body for grasping by the individual;
a pivot coupled between said primary body and said handle for positioning said handle between an operating position and a storage position;
a secondary body defining a secondary aperture and a secondary chamber for receiving the object;
said secondary body coupled to said handle;
a support frame coupled to said primary body and extending above said primary body;
a seat coupled to said support frame and extending over said primary body;

said seat supporting the lower torso of the individual;

said secondary body defining a secondary support surface for supporting the upper torso of the individual; and said storage position reducing the overall height of said primary body and said secondary body from said operating position.

13. The cart as set forth in claim 12, further including a primary closure coupled to said primary body and covering said primary aperture for sealing said primary chamber.

14. The cart as set forth in claim 12, wherein said plurality of wheels include a first wheel and a second wheel;

a first wheel plate extending between a proximal end and a distal end;

said proximal end of said first wheel plate pivotably coupled to said primary body;

said first wheel rotatably coupled to said distal end of said first wheel plate;

a first suspension linkage coupled between said primary body and said first wheel plate for defining a first wheel suspension for reducing shock forces to said primary body and said secondary body while transporting the cart over the surface;

a second wheel plate extending between a proximal end and a distal end;

said proximal end of said second wheel plate pivotably coupled to said primary body;

said second wheel rotatably coupled to said distal end of said second wheel plate; and a second suspension linkage coupled between said primary body and said second wheel plate for defining a second wheel suspension for reducing shock forces to said primary body and said secondary body while transporting the cart over the surface.

15. The cart as set forth in claim 12, further including a lower cushion layer coupled to said seat for cushioning the contact area with the lower torso of the individual; and an upper cushion layer coupled to said secondary support surface for cushioning the contact area with the upper torso of the individual.

16. The cart as set forth in claim 12, further including a third body defining a third aperture and a third chamber for receiving the object; and said third body coupled to said support frame.

17. The cart as set forth in claim 12, further including a frame aperture within said support frame; and said frame aperture permitting access through said support frame and into said primary aperture of said primary body.

18. The cart as set forth in claim 12, further including a handle elevation adjuster coupled to said handle and said primary body for displacing said handle in an ascending displacement relative to said primary body or a descending displacement relative to said primary body; and said handle elevation adjuster adjusting the height of said handle above said primary body.

19. The cart as set forth in claim 18, wherein said handle elevation adjuster displaces said secondary body for defining a secondary body elevation adjuster;

said secondary body elevation adjuster displacing said secondary body in said ascending displacement relative to said primary body or said descending displacement relative to said primary body; and said secondary body elevation adjuster adjusting the height of said secondary support surface for adjusting the height engagement of the upper torso of the individual above said primary body.

20. The cart as set forth in claim 12, further including a pivot lock for terminating pivoting of said handle relative to said primary body in said operating position of said handle.

21. The cart as set forth in claim 20, wherein said pivot lock includes a first latch element and a second latch element;

said first latch element slidably engaging said primary body between a latch lock position and a latch unlock position;

said second latch element coupled to said handle;

said latch lock position defining said first latch element engaging with said second latch element for maintaining said handle in said operating position; and said latch unlock position defining said first latch element disengaging with said second latch element for permitting pivoting of said handle relative to said primary body and positioning said handle in said storage position.

* * * * *